Dec. 11, 1962    J. J. SHAPIRO ET AL    3,067,915
LIQUID DISPENSING DEVICES
Filed May 23, 1960    3 Sheets-Sheet 1
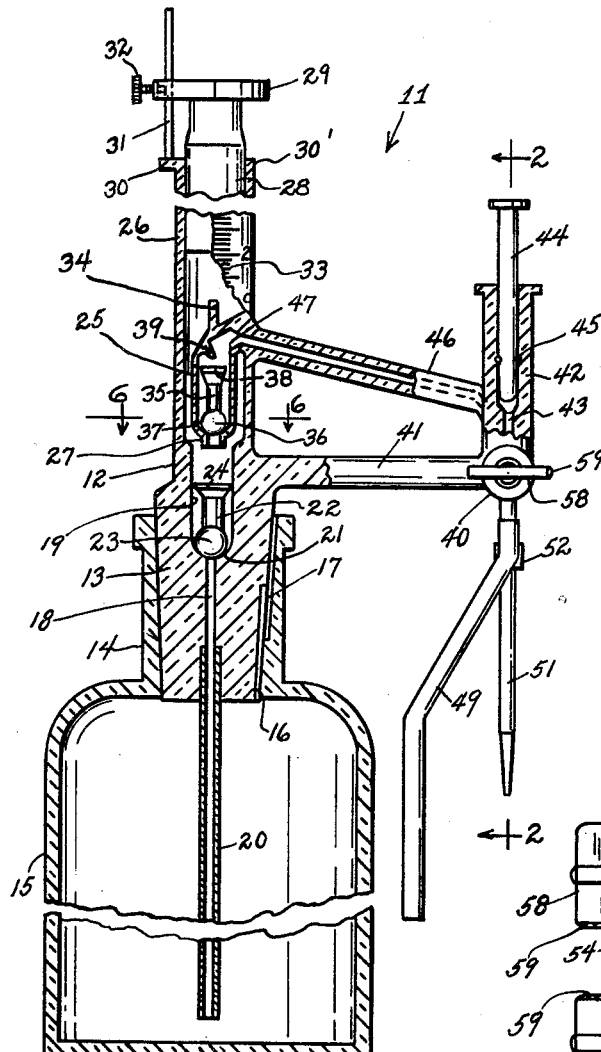
FIG.1
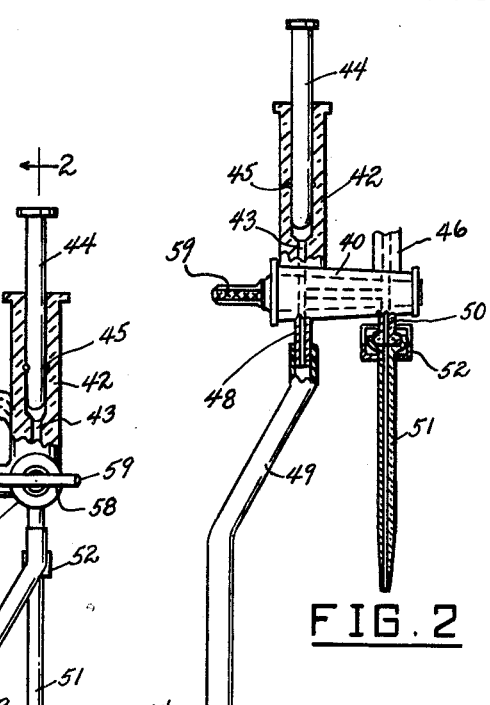
FIG.2
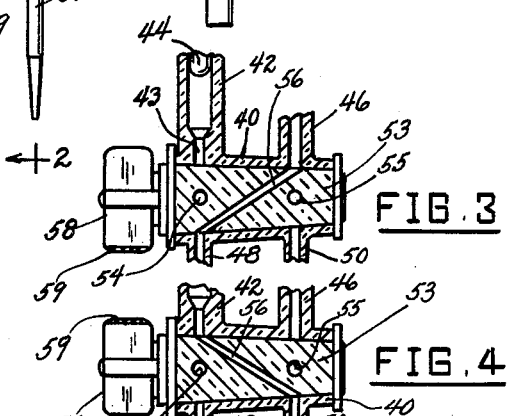
FIG.3
FIG.4
FIG.5
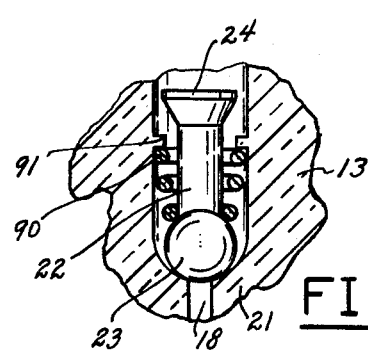
FIG.8
INVENTORS
JUSTIN J. SHAPIRO,
CZESLAW DEMINET, AND
CHARLES E. CAMENSON
BY Herman L. Gordon
ATTORNEY Dec. 11, 1962   J. J. SHAPIRO ET AL   3,067,915
LIQUID DISPENSING DEVICES
Filed May 23, 1960   3 Sheets-Sheet 2

INVENTORS
JUSTIN J. SHAPIRO,
CZESLAW DEMINET, AND
CHARLES E. CAMENSON
BY Herman L. Gordon
ATTORNEY

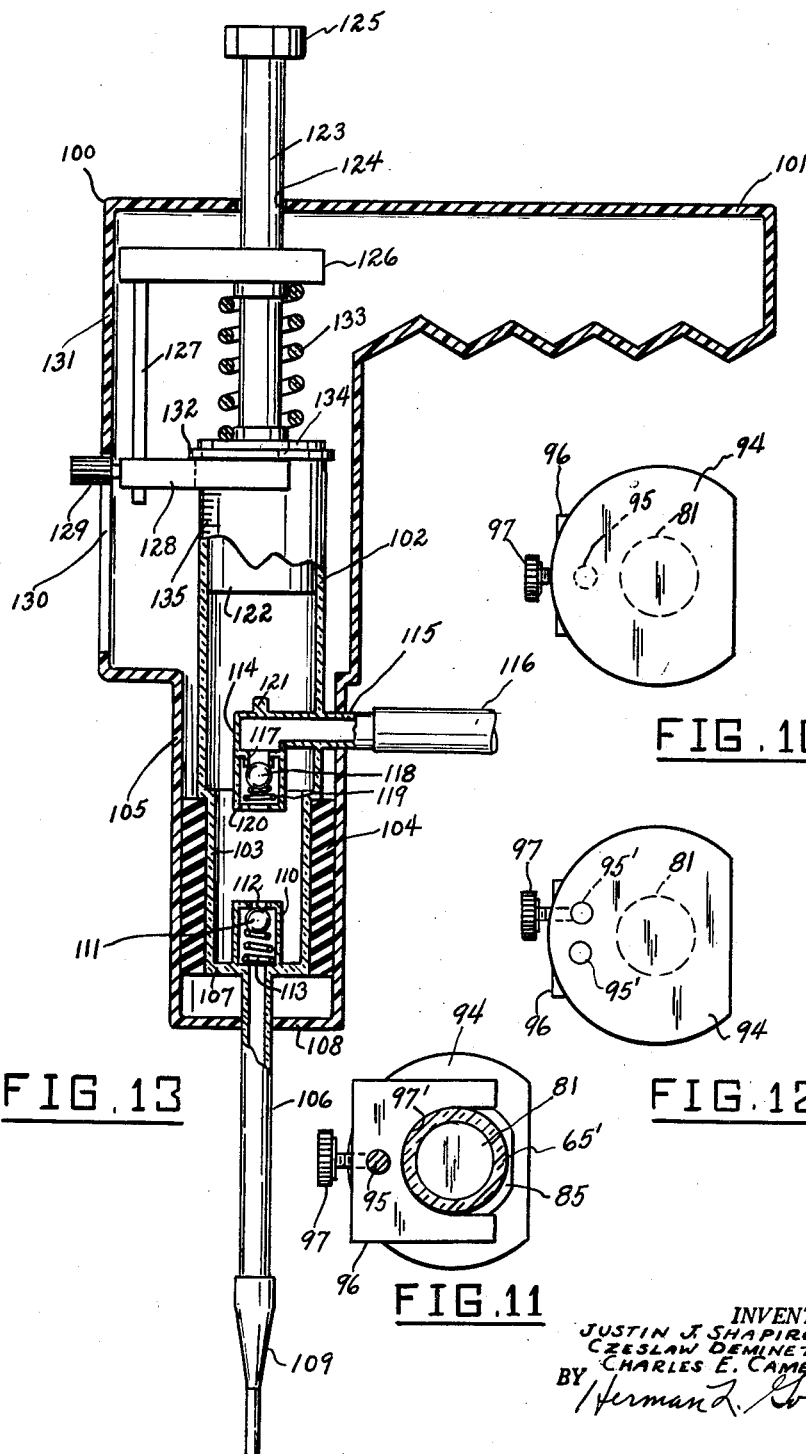

United States Patent Office 3,067,915
Patented Dec. 11, 1962

3,067,915
LIQUID DISPENSING DEVICES
Justin J. Shapiro, Berkeley, Czeslaw Deminet, Richmond, and Charles E. Camenson, Alamo, Calif., assignors to Microchemical Specialties Co., Berkeley, Calif.
Filed May 23, 1960, Ser. No. 31,103
15 Claims. (Cl. 222—255)

This invention relates to devices for accurately dispensing liquids, and more particularly to chemical apparatus known as burettes.

A main object of the invention is to provide a novel and improved apparatus for accurately dispensing liquids, the apparatus being simple in construction, being easy to operate, and providing an accurate means for delivering measured amounts of liquid, for example, delivering a measured amount of liquid from a reagent bottle to a test tube or sample receptacle.

A further object of the invention is to provide an improved burette apparatus which is relatively inexpensive to manufacture, which involves only a few parts, and which enables accurately measured volumes of liquids to be dispensed from a supply container to a test tube or other sample receptacle in a safe and reliable manner.

A still further object of the invention is to provide an improved burette device which is relatively compact in size, which is durable in construction, and which is easy to clean.

A still further object of the invention is to provide an improved liquid dispensing apparatus which includes means for washing out a measured sample with a precise (and preset) volume of diluent and which does not allow any of the measured sample to remain within the measuring chamber of the apparatus but causes it to be washed out without loss of stoichiometric treatment, the apparatus enabling the measuring and washing procedures to be accomplished with a minimum amount of manipulation and attention on the part of the operator, and providing precise sampling and dilutions.

Further objects and advantages of the invention will become apparent from the following description and claims, and from the accompanying drawings, wherein:

FIGURE 1 is a vertical cross-sectional view, partly in front elevation, of an improved burette device constructed in accordance with the present invention.

FIGURE 2 is a vertical cross-sectional view taken substantially on the line 2—2 of FIGURE 1.

FIGURE 3 is an enlarged vertical cross-sectional view taken through the stopcock member of the burette device of FIGURE 1, the stopcock member being in a position enabling the diluent syringe to be filled to a desired volume.

FIGURE 4 is an enlarged vertical cross-sectional view similar to FIGURE 3, but showing the stopcock member in a position enabling a sample of the liquid to be dispensed to be drawn into the calibrated delivery tip of the device.

FIGURE 5 is an enlarged vertical cross-sectional view similar to FIGURE 3, but showing the stopcock member in a position to discharge the diluent along with the measured volume of sample liquid through the calibrated delivery tip of the device.

FIGURE 8 is an enlarged vertical cross-sectional view taken through a modified form of valve assembly which may be employed in a burette device according to the present invention.

FIGURE 10 is a plan view taken on line 10—10 of FIGURE 9.

FIGURE 11 is a horizontal cross-sectional view taken on line 11—11 of FIGURE 9.

FIGURE 12 is a view similar to FIGURE 10, but showing a modification.

FIGURE 13 is a vertical cross-sectional view showing a further modified form of the present invention.

Figure 6:
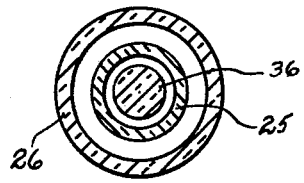
FIGURE 6 is an enlarged horizontal cross-sectional view taken on line 6—6 of FIGURE 1.

Referring to the drawings, and more particularly to FIGURES 1 to 6, 11 generally designates one form of burette device constructed in accordance with this invention. The device 11 comprises a main body 12 of glass or other suitable material formed with a stopper portion 13 adapted to be sealingly engaged in the neck 14 of a diluent reagent bottle 15. The stopper portion 13 is formed with a vent groove 16 adapted to be registered with a similar vent groove 17 formed in the internal sealing surface of the neck 14 to allow air to pass freely between the top portion of the bottle and the atmosphere when the device is placed in operation.

Stopper portion 13 is formed with an axial bore 18 communicating at its top end with a valve chamber 19 and at its bottom end with a depending intake tube 20 secured in the stopper portion and of sufficient length to extend into the bottom portion of the bottle 15.

Valve chamber 19 is substantially cylindrical in shape and is provided with a rounded bottom 21 defining an annular valve seat around the top end of bore 18. Slidably disposed in the chamber 19 is a valve member 22 having a bottom valve ball element 23 and an enlarged top annular guide flange 24 which guides the valve member for vertical movement in the bore 19 but which affords ample clearance for free flow of liquid therepast.

Designated at 25 is an auxiliary valve chamber which is formed integrally with main body 12 and is located above the valve chamber 19, as shown in FIGURE 1. Valve chamber 25 is concentrically mounted in the lower portion of a vertical cylindrical syringe chamber 26 formed integral with the main body 12. Valve chamber 25 is provided with a short depending inlet conduit portion 27 which is engageable by the top end of valve member 22 to limit upward movement of said valve member.

A syringe plunger 28 is slidably and sealingly mounted in the syringe chamber 26, extending upwardly through the top end of the chamber 26 and being provided at its top end with a flange 29 which may be employed as the actuating handle for the plunger. The top end of chamber 26 is provided with a peripheral flange 30 which is partly cut away, as shown at 30'. A metering rod element 31 extends slidably through flange 29 and is engageable at its bottom end with flange 30 to limit the downward movement of plunger 28. A set screw 32 is provided in flange 29 lockingly engageable with metering rod 31 to lock the rod in a position corresponding to a selected volume of liquid in chamber 26, as indicated by the position of the bottom end of plunger 28 with respect to a volume scale 33 inscribed on the exterior wall of the chamber. An upstanding stop lug 34 is provided on the top of valve chamber 25 which is engageable by the bottom end of plunger 28 to establish its zero position, relative to scale 33.

A vertically movable valve member 35 is disposed in the auxiliary valve chamber 25, said valve member having a bottom valve ball element 36 sealingly engageable on the annular valve seat defined by the rounded bottom 37 of valve chamber 25. Valve member 35 is provided with the enlarged top guide flange 38 which guides the valve member for substantially axial movement in chamber 25 but which affords ample clearance for flow of liquid therepast. An integral stop lug 39 is provided in the top end of chamber 25 to limit upward movement of valve member 35.

Designated at 40 is a three-way, four-arm stopcock whose frusto-conical stationary sleeve portion is integrally connected to main body 12 by a substantially horizontally extending brace arm 41. One upper arm of stopcock 40 comprises a vertical upstanding syringe chamber 42 communicating with the stopcock by a port 43. A syringe plunger 44 is provided in the chamber 42 and is sealingly and slidably disposed therein, a suitable sealing ring 45 being provided between the plunger and the interior wall of the chamber, said interior wall being annularly recessed to receive the sealing ring. The remaining upper arm of stopcock 40 comprises a conduit 46 which communicates with the top space 47 of the auxiliary valve chamber 25.

One lower arm of stopcock 40 comprises a depending conduit 48 which is located diametrically opposite port 43. A waste tube 49 is connected to conduit 48 and may be employed to convey liquid from conduit 48 to a suitable waste receptacle. The other lower arm of stopcock 40 comprises a depending syringe tip fitting conduit 50 which is diametrically opposite the connection of conduit 46. A calibrated discharge tip 51 is detachably connected to the syringe tip fitting 50 by a suitable conventional spring connector 52.

The stopcock 40 is provided with the frusto-conical rotor 53 having the parallel spaced diametral bores 54 and 55 located to register respectively with the diametrically opposing bore passages of the members 42 and 48 and the members 46 and 50 when the rotor 53 is in the position illustrated in FIGURE 5. Said rotor is further provided with an inclined passage 56 located so as to connect member 46 to member 48 in the rotor position of FIGURE 3, and to connect member 42 to member 50 in the rotor position of FIGURE 4.

Rotor 53 is provided with the operating handle 58 which has a colored tip 59 to indicate the setting of the stopcock. As shown in FIGURES 3, 4 and 5, the above described settings of the rotor may be obtained by rotating the handle 58 to respective positions, for example, the position of FIGURE 3, wherein tip 59 is directed downwardly, placing member 46 in comunication with member 48, the position of FIGURE 4, wherein the tip 59 is directed upwardly, placing member 42 in communication with member 50, and the position of FIGURE 5, wherein tip 59 is directed horizontally, connected members 42 and 48 and members 46 and 50.

In operation, with the stop cock handle 58 in the position of FIGURE 3, namely, with the colored tip 59 directed downwardly, the syringe plunger 28 is pulled upwardly, drawing diluent liquid from the bottle 15 into the syringe chamber 26. During this action, the valve member 22 is elevated by the liquid from tube 20 and bore 18, covering the bottom end of conduit 27, so that the liquid cannot enter auxiliary valve chamber 25. The plunger 28 is then depressed to the position wherein metering rod 31 engages flange 30, forcing excess diluent through the auxilary valve chamber 25, conduit 46, stopcock passage 56 and waste conduit 48 to the waste tube 49. During the downward movement of plunger 28, valve element 22 seals passage 18 and valve element 35 becomes unseated. At the end of the downward stroke of plunger 28, a quantity of diluent remains in the syringe chamber 26, determined by the setting of metering rod 31.

Stopcock handle 58 is then rotated to the position of FIGURE 4, wherein the colored tip 59 is directed upwardly, so that the calibrated tip 51 is placed in communication with syringe chamber 42. Calibrated tip 51 is then immersed in the container of the liquid to be sampled and the sample is then drawn into the tip 51 by raising the syring plunger 44 until the sample liquid at least completely fills the tip 51.

Stopcock handle 58 is then rotated to the position of FIGURE 5, wherein the colored tip 59 is directed horizontally. Plunger 44 is then pushed down, discharging excess sample liquid into the waste tube 49. A test tube or other desired receiving receptacle is placed under the calibrated tip 51. The plunger 28 is then rotated until metering rod 31 is over the cut away region 30' adjacent flange 30 so that said metering rod clears the flange and is free to move downwardly. The diluent plunger 28 is pushed downwardly to engage the stop member 34, washing the measured quantity of the sample, together with the diluent liquid out through the calibrated tip 51 into the test tube or other receiving receptacle. Under these conditions, valve member 35 is elevated to open position and valve member 22 is held closed.

Figure 7:
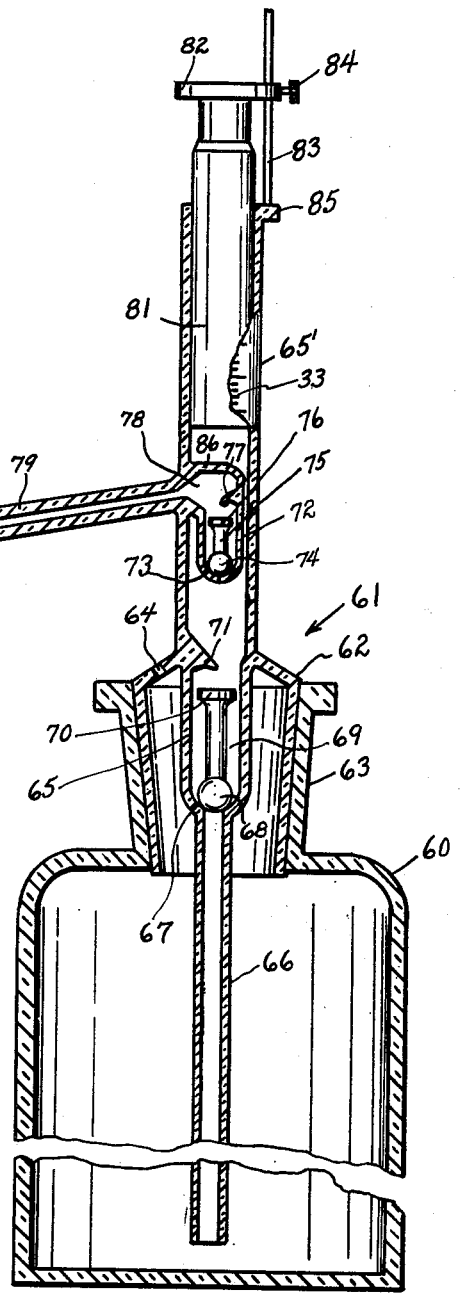
FIGURE 7 is a vertical cross-sectional view taken through a modified form of liquid dispensing device according to the present invention.

In the modified form of the invention shown in FIGURE 7, no diluent liquid is employed and the device merely delivers a desired volume of sample liquid from a reagent bottle 60. The dispensing device is designated generally at 61 and comprises a hollow stopper member 62 adapted to sealingly engage in the neck 63 of the reagent bottle. The stopper member is formed in its top wall with an air vent opening 64. A syringe chamber 65' is formed integrally with the hollow stopper 62 and is provided at its bottom end with a valve chamber 65 located axially in the stopper. A depending conduit 66 is formed integrally with the bottom of chamber 65 and is of sufficient length to extend to the lower portion of the reagent bottle 60. The rounded bottom of chamber 65 defines an annular valve seat 67 on which is normally supported the spherical bottom valve ball element 68 of a vertically movable valve member 69. Valve member 69 is provided with the enlarged top guide flange 70 which maintains the valve member in a substantially vertical position in chamber 65 but which affords ample clearance for the passage of liquid therepast. The chamber 65 is provided with a stop lug 71 located above flange 70 and cooperable with the top end of valve member 69 to limit upward movement thereof.

An auxiliary valve member 72 is integrally formed in the lower portion of the syringe chamber 65', the auxiliary valve chamber being formed with the rounded annular bottom seat 73 on which is normally seated the bottom spherical valve ball element 74 of a vertically movable valve member 75 contained in chamber 72. Valve member 75 is provided with the enlarged top guide flange 76 maintaining valve member 75 substantially vertical in chamber 72 but affording ample clearance for the flow of liquid therepast. The chamber 72 is provided in its top portion with a stop lug 77 engageable by the top end of valve member 75 to limit upward movement thereof.

The upper space 78 of valve chamber 72 communicates with an outwardly extending, downwardly inclined discharge tube 79 formed integral with the syringe chamber 65' and terminating in a depending discharge nozzle 80. A syringe plunger 81 is slidably and sealingly disposed in the upper portion of syringe chamber 65' and has cemented to its top end an operating flange 82. A vertical metering rod 83 is adjustably secured in the flange 82 by a set screw 84 and is engageable with a partial flange 85 on the top end of syringe chamber 65' to limit downward movement of the plunger 81 to a position in accordance with the desired volume of sample liquid to be dispensed. A scale similar to the scale 33 is inscribed on the exterior surface of chamber 65', the zero position of said scale corresponding to the lowermost position of the bottom end of plunger 81, which is defined by the top wall 86 of valve chamber 72.

Before operation, the plunger 81 is removed and the chamber 65' is filled with liquid, whereupon the plunger 81 is replaced. The plunger 81 is lowered until the metering rod 83 engages the partial flange 85 at some portion of its full diameter. The plunger 81 is now rotated until the metering rod 83 no longer engages the flange 85 and is free to be depressed. During the downward stroke of plunger 81, valve member 69 is held closed and valve member 75 opens to allow the amount of liquid determined by the metering rod to be discharged through tube 79 into a receptacle. After discharge, the plunger 81 is again raised until the metering rod rests on the partial flange 85. To discharge the required amount of sample liquid, a test tube or other receiving receptacle is placed under the nozzle 80, and the plunger 81 is rotated until the metering rod clears the flange 85. The plunger 81 is then depressed to move the bottom end of the plunger into engagement with the top wall 86 of chamber 72, causing the required amount of sample liquid to be discharged into the test tube or other receiving receptacle.

Instead of employing gravity-biased valve members as above described, the valves may be biased towards closed positions by springs. Thus, as shown in FIGURE 8, the valve member 22, employed in the valve chamber of the stopper 13, may be biased towards seating engagement with the valve seat 21 by a suitable coiled spring 90 surrounding the stem of the valve member and bearing between the spherical valve element 23 and an annular retaining rib 91 integrally formed in the wall of the valve chamber. Similar biasing springs may be provided for the other valves in the embodiments of the invention above described. The springs may be made of any suitable material, such as fused quartz or stainless steel.

Figure 9:
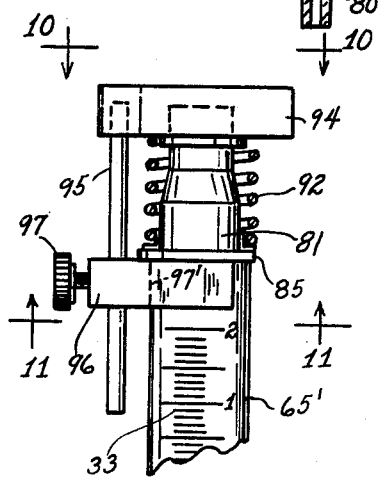
FIGURE 9 is an enlarged fragmentary elevational view of the top portion of further modified form of burette device in accordance with the present invention.

FIGURES 9, 10 and 11 illustrate an alternative metering arrangement, wherein the dispensing plunger 81 is biased upwardly with respect to the syringe chamber 65 by a coiled return spring 92, said spring surrounding the upper portion of the plunger and bearing between an actuating head block 94 secured to the top end of the plunger and the top flange 85 of the syringe chamber. A depending metering rod 95 is secured to the head block 94 and extends slidably through a guide block 96 which is formed with a rounded notch 97' receiving and slidably engaging the syringe chamber 65'. A set screw 97 extends threadedly through the side marginal portion of block 96 and clampingly engages the metering rod 95. Upward movement of block 96 is limited by its engagement with the under side of flange 85.

Block 96 may be set to clamp rod 95 at a position in accordance with the volume of liquid to be dispensed by a downward stroke of plunger 81. Thus, the volume of liquid drawn into the syringe chamber 65' when the plunger is elevated by spring 92 to its limiting position will depend upon the setting of the block 96 with respect to the metering rod 95. The desired volume to be dispensed will be established by the position of block 96 with respect to the scale 33 when the plunger 81 is depressed to its lowermost limiting position, namely, when the plunger engages the top wall 86 of valve chamber 72.

The metering arrangement of FIGURES 9 to 11, namely, including a return spring, may also be employed with the plunger 28 of the form of the invention illustrated in FIGURE 1.

As shown in FIGURE 12, instead of employing a single depending metering rod, a pair of spaced parallel depending metering rods 95', 95' may be employed, which prevents plunger 81 from rotating with respect to syringe chamber 65' and thus provides better accuracy in dispensing the desired volume of liquid.

FIGURE 13 illustrates a further modified form of the present invention, wherein the dispenser is mounted in a transparent plastic housing 100 integrally formed with a hand grip portion 101, so that it may be held in the manner of a "squirt gun." The syringe chamber 102 is formed with a reduced lower end portion 103 which is embedded in a resilient supporting body 104 of rubberlike material molded into the lower portion of the barrel 105 of housing 100 so that the syringe chamber 102 is resiliently supported substantially coaxially with said barrel 105. The discharge conduit 106, formed integrally with the bottom wall 107 of the syringe chamber extends through the bottom wall 108 of the housing 100 and projects a substantial distance therefrom. A suitable dispensing tip 109, of polyethylene or the like, is mounted on the end of the rigid discharge conduit 106.

The bottom wall 107 is formed with an outlet valve chamber 110 which communicates with discharge conduit 106 and which is provided with a valve ball element 111 normally held in sealing engagement with a valve opening 112 formed centrally in the top wall of the valve chamber 110 by a biasing spring 113 bearing between the bottom wall of the valve chamber and the valve ball element, as shown.

Syringe chamber 102 is integrally formed at its intermediate portion with an inlet valve chamber 114 and an inlet conduit 115, which extends through the wall of the barrel 105 at the same side of the housing 100 as the hand grip portion 101. A flexible conduit 116 is connected to the rigid conduit 115, the flexible conduit 116 leading to a reagent bottle or other receptacle containing the liquid to be dispensed. The flexible conduit 116 may be connected to a suction tube on a suitable screw cap on a reagent bottle, said screw cap being suitably vented to allow for the entry of air to replace the liquid withdrawn through the suction tube from the bottle.

As shown, the valve chamber 114 is located substantially coaxially within the lower portion of the syringe chamber 102 and is formed internally with an annular valve seat 117 against which is normally engaged a valve ball element 118 urged upwardly toward sealing engagement by a biasing spring 119 which bears between the valve ball element and the centrally apertured bottom wall 120 of the valve chamber 114. The top wall of the valve chamber 114 is formed with an upstanding stop lug 121 which limits the downward movement of the syringe plunger, shown at 122.

Plunger 122 is provided with the actuating rod 123 which extends slidably through an opening 124 formed in the top wall of the housing 100 adjacent the hand grip portion 101. Rod 123 is provided at its end with a head element 125.

A block member 126 is rigidly secured to the plunger rod 123 and is provided with a depending metering rod 127 which extends slidably through a guide block 128 similar to the guide block 96 previously described. A set screw 129 extends threadedly through the side marginal portion of block 128 and clampingly engages the metering rod 127. The elongated head of the set screw 129 extends slidably through an elongated longitudinal slot 130 formed in the outer side wall 131 of housing 100 opposite the hand grip member 101.

Guide block 128 receives and slidably engages the syringe chamber 102 beneath the top flange 132 of the syringe chamber. A coiled return spring 133 surrounds plunger rod 123 and bears between block 126 and a centering washer 134 mounted on the top end of syringe chamber 102 adjacent the flange 132, to bias the syringe plunger upwardly to a position determined by the engagement of the guide block 128 with the syringe chamber flange 132.

A suitable scale 135 is inscribed on the external surface of the syringe chamber 102 to enable guide block 128 to be set to provide a desired volume of discharge of sampled liquid on the actuating stroke of the syringe plunger. Thus, the block 128 may be clamped to the metering rod 127 at a position corresponding to said desired volume, with the plunger 122 depressed into engagement with the stop lug 121. The desired volume of liquid will then be drawn into the syringe chamber by the action of the return spring 133 when the head 125 of the plunger rod is released and the plunger is allowed to move upwardly to a position wherein block 128 engages flange 132.

Alternatively, a scale may be incribed on the outer side wall 131 adjacent the slot 130 and the guide block 128 may be set with reference to this scale, thereby allowing housing 100 to be made of opaque material.

With tube 116 connected to the reagent bottle, as above described, when plunger 122 moves upwardly by the action of spring 133, valve ball element 118 opens and allows sample liquid to be drawn into the syringe chamber by suction, the valve ball element 111 being held closed. To discharge the sample, head 125 is depressed until plunger 122 engages stop lug 121. Valve ball element 111 opens to allow the liquid to be discharged through conduit 106, whereas valve ball element 118 is held closed.

While certain specific embodiments of liquid dispensing devices have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a burette device of the character described, a syringe chamber, a dispensing plunger sealingly and slidably mounted in said chamber and being provided with an actuating portion projecting from said chamber, an inlet conduit communicatively connected to said chamber, first check valve means mounted between the inlet conduit and the chamber and opening responsive to suction developed by outward movement of the plunger relative to the chamber, an outlet conduit communicatively connected to the chamber, and second check valve means mounted between the outlet conduit and the chamber and opening responsive to the pressure developed by the inward movement of the plunger relative to the chamber, one of said check valve means comprising a valve chamber mounted in said syringe chamber, said valve chamber having a bottom opening and a valve ball element disposed adjacent to and cooperating with said bottom opening, said valve chamber being provided at its top end with stop means limiting inward movement of the plunger, said valve chamber being closed at its top end.

2. In a burette device of the character described, a syringe chamber, a dispensing plunger sealingly and slidably mounted in said chamber and being provided with an actuating portion projecting from said chamber, an inlet conduit communicatively connected to said chamber, first check valve means mounted coaxially with the plunger between the inlet conduit and the chamber and opening responsive to suction developed by outward movement of the plunger relative to the chamber, an outlet conduit communicatively connected to the chamber, second check valve means mounted coaxially with the plunger between the outlet conduit and the chamber and opening responsive to the pressure developed by the inward movement of the plunger relative to the chamber, an upwardly projecting stop lug on said second check value means engageable by the plunger to limit inward movement thereof, and rigid additional stop means on the actuating portion of the plunger and located so as to engage the chamber at a predetermined extended position of the plunger relative to the chamber.

3. In a burette device of the character described, a syringe chamber, a dispensing plunger sealingly and slidably mounted in said chamber and being provided with an actuating portion projecting from said chamber, an inlet conduit communicativelly connected to said chamber, first check valve means mounted coaxially with the plunger between the inlet conduit and the chamber and opening responsive to suction developed by outward movement of the plunger relative to the chamber, an outlet conduit communicatively connected to the chamber, second check valve means mounted coaxially with the plunger between the outlet conduit and the chamber and opening responsive to the pressure developed by the inward movement of the plunger relative to the chamber, one of said check valve means being provided with an upwardly projecting stop lug located so as to be engaged by the plunger to limit inward movement thereof, and rigid additional stop means on the actuating portion of the plunger and located so as to engage the chamber at a predetermined extended position of the plunger relative to the chamber.

4. In a burette device of the character described, a syringe chamber, a dispensing plunger sealingly and slidably mounted in said chamber and being provided with an actuating portion projecting from said chamber, an inlet conduit communicatively connected to said chamber, first check valve means mounted coaxially with the plunger between the inlet conduit and the chamber and opening responsive to suction developed by outward movement of the plunger relative to the chamber, an outlet conduit communicatively connected to the chamber, second check valve means mounted coaxially with the plunger between the outlet conduit and the chamber and opening responsive to the pressure developed by the inward movement of the plunger relative to the chamber, one of said check valve means being provided with an upwardly projecting stop lug located to be engaged by the plunger to limit inward movement thereof, and rigid additional stop means adjustably secured to the actuating portion of the plunger and located so as to engage the chamber at a predetermined extended position of the plunger relative to the chamber.

5. In a burette device of the character described, a syringe chamber, a dispensing plunger sealingly and slidably mounted in said syringe chamber and being provided with an actuating portion projecting from said syringe chamber, an inlet conduit communicatively connected to the end of the syringe chamber opposite said actuating portion, a first check valve mounted between said inlet conduit and said end of the chamber, means opening said first check valve responsive to suction developed by outward movement of the dispensing plunger relative to the chamber, an outlet conduit communicatively connected to said chamber, a second check valve mounted between the outlet conduit and the chamber, said second check valve comprising a valve chamber mounted in the syringe chamber and having a bottom aperture and a movable valve ball element disposed in and cooperating with said bottom aperture, and means opening said second check valve responsive to pressure developed by the inward movement of the plunger relative to the syringe chamber, said valve chamber being closed at its top end.

6. In a burette device of the character described, a diluent syringe chamber, a dispensing plunger sealingly and slidably mounted in said syringe chamber and being provided with an actuating portion projecting from said syringe chamber, an inlet conduit communicatively connected to the end of the syringe chamber opposite said actuating portion, a first check valve mounted between said inlet conduit and said end of the chamber, means opening said first check valve responsive to suction developed by outward movement of the dispensing plunger relative to the chamber, an outlet conduit communicatively connected to said chamber, a second check valve mounted between the outlet conduit and the chamber, means opening said second check valve responsive to pressure developed by the inward movement of the plunger relative to the chamber, a sample syringe, a sample pipette, a manually operated valve connected between said outlet conduit, said sample syringe and said sample pipette and having a manually movable element provided with a first passage connecting said sample syringe to said sample pipette in one position of said element, whereby to fill said pipette, and having another passage connecting said outlet conduit to said sample pipette in another position of said element, whereby to empty said pipette responsive to the pressure developed by said inward movement of the plunger and transmitted through said outlet conduit.

7. In a burette device of the character described, a diluent syringe chamber, a dispensing plunger sealingly and slidably mounted in said chamber and being provided with an actuating portion projecting from said chamber, an inlet conduit communicatively connected to said chamber, first check valve means mounted between the inlet conduit and the chamber and opening responsive to suction developed by outward movement of the plunger relative to the chamber, an outlet conduit communicatively connected to the chamber, second check valve means mounted between the outlet conduit and the chamber and opening responsive to the pressure developed by the inward movement of the plunger relative to the chamber, a sample syringe, a sample pipette, a manually operated valve connected between said outlet conduit, said sample syringe and said sample pipette and having a manually movable element provided with a first passage connecting said sample syringe to said sample pipette in one position of said element, whereby to fill said pipette, and having another passage connecting said outlet conduit to said sample pipette in another position of said element, whereby to empty said pipette responsive to the pressure developed by said inward movement of the plunger and transmitted through said outlet conduit.

8. In a burette device of the character described, a syringe chamber, a dispensing plunger sealingly and slidably mounted in said chamber and being provided with an actuating portion projecting from said chamber, a discharge conduit communicatively connected to the end of the chamber opposite said actuating portion, downwardly movable first check valve means mounted between said end of the chamber and said discharge conduit and opening responsive to pressure developed by inward movement of the plunger in the chamber, an inlet conduit communicatively connected to the intermediate portion of said chamber, and second check valve means mounted in said intermediate portion between said chamber and said inlet conduit in axial alignment with the plunger and opening responsive to suction developed by outward movement of the plunger in the chamber.

9. In a burette device of the character described, a syringe chamber, a dispensing plunger sealingly and slidably mounted in said chamber and being provided with an actuating portion projecting from said chamber, a discharge conduit communicatively connected to the end of the chamber opposite said actuating portion, downwardly movable first check valve means mounted between said end of the chamber and said discharge conduit and opening responsive to pressure developed by inward movement of the plunger in the chamber, an inlet conduit communicatively connected to the intermediate portion of said chamber, second check valve means mounted in said intermediate portion between said chamber and said inlet conduit in axial alignment with the plunger and opening responsive to suction developed by outward movement of the plunger in the chamber, fixed stop means in the chamber engageable by the plunger to limit inward movement of the plunger, and adjustable stop means connected between the chamber and the actuating portion of the plunger to limit outward movement of the plunger.

10. In a burette device of the character described, a syringe chamber, a dispensing plunger sealingly and slidably mounted in said chamber and being provided with an actuating portion projecting from said chamber, a discharge conduit communicatively connected to the end of the chamber opposite said actuating portion, downwardly movable first check valve means mounted between said end of the chamber and said discharge conduit and opening responsive to pressure developed by inward movement of the plunger in the chamber, an inlet conduit communicatively connected to the intermediate portion of said chamber, second check valve means mounted in said intermediate portion between said chamber and said inlet conduit in axial alignment with the plunger and opening responsive to suction developed by outward movement of the plunger in the chamber, fixed stop means in the chamber engageable by the plunger to limit inward movement of the plunger, and further stop means secured to the actuating portion of the plunger and engageable with the chamber to limit outward movement of the plunger.

11. In a burette device of the character described, a syringe chamber, a dispensing plunger sealingly and slidably mounted in said chamber and being provided with an actuating portion projecting from said chamber, a discharge conduit communicatively connected to the end of the chamber opposite said actuating portion, downwardly movable first check valve means mounted between said end of the chamber and said discharge conduit and opening responsive to pressure developed by inward movement of the plunger in the chamber, an inlet conduit communicatively connected to the intermediate portion of said chamber, second check valve means mounted in said intermediate portion between said chamber and said inlet conduit in axial alignment with the plunger and opening responsive to suction developed by outward movement of the plunger in the chamber, fixed stop means in the chamber engageable by the plunger to limit inward movement of the plunger, and adjustable stop means on the actuating portion of the plunger located so as to engage the chamber at a predetermined extended position of the plunger relative to the chamber.

12. In a burette device of the character described, a main syringe chamber, a dispensing plunger sealingly and slidably mounted in said main chamber and being provided with an actuating portion projecting from said main chamber, a discharge conduit communicatively connected to the end of the chamber opposite said actuating portion, a first check valve mounted between said end of the chamber and said discharge conduit, means to open said first check valve responsive to pressure developed by inward movement of the plunger in the chamber, a check valve chamber mounted in the intermediate portion of said main chamber in axial alignment with the plunger and having an opening communicating with said main chamber, an inlet conduit communicatively connected to said check valve chamber at said intermediate portion, a second check valve mounted in said check valve chamber normally sealingly engaging in said opening, and means to open said second check valve responsive to suction developed by outward movement of the plunger relative to said main chamber.

13. The structure of claim 12, and an upwardly projecting lug on said check valve chamber engageable by the plunger to limit inward movement of the plunger.

14. The structure of claim 13, and further stop means on the actuating portion of the plunger located so as to engage the main chamber at a predetermined extended position of the plunger relative to the chamber.

15. The structure of claim 13, and a stop member adjustably secured to the actuating portion of the plunger and located so as to engage the main chamber at a predetermined extended position of the plunger relative to the chamber.

References Cited in the file of this patent
UNITED STATES PATENTS

| | | |
|---|---|---|
| 2,096,461 | Mane et al. | Oct. 19, 1937 |
| 2,445,279 | Palm et al. | July 13, 1948 |
| 2,521,433 | White | Sept. 5, 1950 |
| 2,606,696 | Miner | Aug. 12, 1952 |
| 2,798,647 | Broadwin | July 9, 1957 |
| 2,837,239 | Scholin | June 3, 1958 |
| 2,881,810 | Breitenstein | Apr. 14, 1959 |

FOREIGN PATENTS

| | | |
|---|---|---|
| 5,993 | Great Britain | Mar. 11, 1912 |
| 615,855 | Great Britain | Jan. 12, 1940 |